3,424,730
VINYLIDENEARYLENEALKYLENE CARBAMATES
AND POLYMERS THEREOF
Lieng-Huang Lee, Midland, Mich., assignor to The Dow
Chemical Company, Midland, Mich., a corporation of
Delaware
No Drawing. Filed Mar. 6, 1964, Ser. No. 350,127
U.S. Cl. 260—80.3                                  20 Claims
Int. Cl. C08f 7/02; C07c 125/06

ABSTRACT OF THE DISCLOSURE

New monomers, vinylidenearylenealkylene carbamates (e.g., ethyl N-ar-vinylbenzyl carbamate), are prepared by reacting at a temperature of from about 0° C. to about −20° C. a vinylidenearylenemethylene primary or secondary amine with a haloformate or a thio or dithio isolog thereof. Such monomers, under the influence of free-radical or ionic catalysts, form homopolymers and copolymers thereof as well as copolymers with other ethylenically unsaturated monomers. The polymeric products are colorless and moldable.

---

This invention relates to polymerization products and to substances suitable as starting materials in the preparation of such polymerization products. More particularly it relates to vinylidenearylenealkylene carbamates, a method of preparing vinylidenearylenealkylene carbamates and polymers of vinylidenearylenealkylene carbamates.

The present invention provides new and useful compounds having the general formula

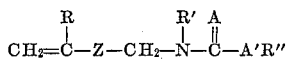

wherein R is hydrogen or methyl, Z is an arylene, A and A' individually are oxygen or sulfur, R' is a radical such as hydrogen or a hydrocarbon radical, i.e., an alicyclic radical, an aryl, an aralkyl or an alkyl having up to 20 carbon atoms, especially a lower alkyl, e.g. an alkyl having from 1 to 4 carbon atoms such as methyl, ethyl, n-propyl, isopropyl, n-butyl and isobutyl, and R" is a hydrocarbon radical such as described for R'.

These compounds are made according to the invention by reacting a vinylidenearylenemethylene amine having at least one hydrogen covalently bonded to the nitrogen atom, i.e., a primary or secondary amine, with a haloformate or a thio or dithio isolog thereof. In the reaction the vinylidenearylenemethylene amine and the isologous haloformate which are selected are determined by the structure of the vinylidenearylenemethylene carbamate desired.

The vinylidenearylenemethylene amine corresponds to the formula

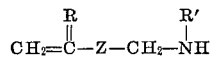

wherein the symbols R, Z, and R' have the meaning defined above. Such amines may be obtained, for example, by the method described in United States Letters Patent 2,780,604. Compounds such as ethyl benzene, ethyl naphthalene, ethylbiphenyl, isopropylbenzene, isopropylnaphthalene, isopropylbiphenyl and their nuclearly substituted monomethyl and dimethyl derivatives are halomethylated (e.g. by reacting such compounds with paraformaldehyde and hydrogen halide) the ethyl and isopropyl substituents are monohalogenated, either before or after the halomethylation step then dehydrohalogenation of the resulting compounds produces a halomethylated vinylidenearomatic compound which is reacted with ammonia or an organic primary amine to produce the desired vinylidenearylenemethylene amine. While ar-vinylbenzylamine is a preferred species of vinylidenearylenemethylene amine for use in the preparation of the vinylidenearylenemethylene carbamates of this invention, other amines within the scope of the above-mentioned formula may be used, especially when Z is phenylene, e.g. ar-vinylbenzylethylamine, ar-vinylbenzylmethylamine, ar-vinylbenzylphenylamine, ar-vinylbenzylnaphthylamine, ar-isopropenylbenzylamine, ar - isopropenylbenzylethylamine, ar - isopropenylbenzylbutylamine, and the like. However, also operable are vinylidenearylenemethylene amines where Z represents other divalent aromatic radicals such as an arylene derived by the removal of 2 hydrogen atoms from each of two different nuclear carbon atoms of naphthalene, diphenyl; anthracene, and the like, for example, ar-vinylnaphthylenemethyleneamine, ar - isopropenylnaphthylenemethyleneamine, ar - vinylnaphthylenemethyleneethylamine, 6 - vinyl - 6'-methyleneaminobiphenyl, ar-isopropenyl - ar' - methyleneaminobiphenyl, ar-vinyl-ar-methyleneaminobiphenyl, and the like.

The isologous haloformate used in the practice of this invention corresponds to the general formula

wherein X is a halogen, preferably chlorine, bromine or iodine, A, A' and R" are as defined above. An especially advantageous group of haloformates are the lower alkyl chloroformates, such as methyl chloroformate, ethyl chloroformate, n-propyl chloroformate, isopropyl chloroformate and n-butyl chloroformate. However, numerous other isologous haloformates may be used such as methyl bromoformate, ethyl thiochloroformate, ethyl dithiochloroformate, dodecyl chloroformate, ethyl iodoformate, phenyl thiochloroformate, phenyl bromoformate, anthryl chloroformate, eicosyl chloroformate, and the like.

An excess, on a molar basis, of the vinylidenearylenemethylene amine herein described usually is used in the reaction. A molar ratio of 1.5 to 1.8 or sometimes 2 or more of the vinylidenearylenemethylene amine per mole of haloformate in the starting material is advantageous. However, if a hydrohalide acceptor such as pyridine or sodium hydroxide is present, substantially equimolar amounts of the vinylidenearylenealkylene amine and the isologous haloformate may be used. The reaction usually is carried out at below room temperature, i.e., at a temperature of from about 0° C. to about −20° C., preferably from about −5° C. to about −15° C.

The vinylidenearylenemethylene carbamates of this invention generally are colorless liquids having high boiling points.

The monomeric compositions of this invention can also be polymerized to form moldable polymers as will appear hereinafter.

According to the present invention, the vinylidenearylenemethylene carbamates of this invention can be polymerized to form polymers which can be molded into useful articles, such as blocks, sheets, films and the like, by conventional techniques. The polymer may be a homopolymer of the vinylidenearylenemethylene carbamate or a copolymer of mixtures of vinylidenearylenemethylene carbamates, or a copolymer of a mixture of one or more vinylidenearylenemethylene carbamates with one or more ethylenically unsaturated monomers which are polymerizable by free-radical means. Typical such polymerizable monomers are styrene and monomers copolymerizable with styrene. Representative illustrative examples of such ethylenically unsaturated compounds are the vinyl esters such as vinyl acetate, vinyl butyrate and the like; vinylidene compounds such as vinylidene chloride and the like;

α,β-ethylenically unsaturated carboxylic acids such as acrylic acid, methacrylic acid, fumaric acid and maleic acid; acrylates and methacrylates such as ethyl acrylate and methyl methacrylate; acrylonitrile, methacrylonitrile; styrene and substituted styrenes, acrylamides; fumaramides; citraconamides; citraconamates, maleamates; maleamides; ethylene, propylene; 1-butene and similar monoethylenically unsaturated copolymerizable materials.

Such polymerization may be accomplished in bulk, in solution, or in emulsion, by thermal activation or by catalysis from free-radical producing means such as peroxygen-type catalysts or other free-radical producing materials such as the azo catalysts or others well known in the art or by the action of ionic catalysts, all at catalytically effective concentrations.

Examples of the peroxygen-type catalysts are diethyl peroxide; hydrogen peroxide; di-tertiary butyl peroxide; persuccinic acid; lauroyl peroxide; tetrahydronaphthalene peroxide; alkali metal, alkaline earth metal or ammonium persulfates, perborates, percarbonates; and the like. Such catalysts usually are used in the range from about 0.01 percent to about 1 percent, based on the weight of the monomers. Other methods of catalysis, such as irradiation by ultraviolet, X-ray and gamma rays as well as by radiation from radioactive materials and high energy electrons generated from linear accelerators, resonant transformers, and the like, may be used if desired. The term "under the influene of free-radical producing means" is defined to include free-radical producing materials as defined above in contact (e.g., either as solid particles or in solution) with the polymerizable monomer mixture and to irradiation as herein described, which produce free-radicals in effective concentration within the polymerization zone. The ionic catalysts include, but are not limited to, such compounds as $AlCl_3$, $BF_3$, $SnCl_4$, $TiCl_4$. Low temperature procedures such as from 0 to $-100°$ C. may be used with such catalysts.

To illustrate more fully the practice of this invention to those skilled in the art, the following examples are given, without any limitation in scope being intended thereby. In the examples all parts and percentages are by weight unless otherwise specified.

EXAMPLE 1

Into a 100-ml., 3-necked, round-bottomed flask was placed 46 grams (0.34 mole) of vinylbenzylamine. The compound was cooled to $-15°$ C. by placing the flask in methylene chloride containing Dry Ice. By means of a dropping funnel, 22 grams (0.20 mole) of ethyl chloroformate was added to the stirred vinylbenzylamine over a period of 30 minutes and a white crystalline salt was observed to form. Stirring was continued for 1½ hours after the last of the ethyl chloroformate was added. The crude reaction product was washed with water and the resulting aqueous and organic solutions were separated. The organic solution was dried over anhydrous sodium sulfate, and to the dried liquid was added a polymerization inhibitor, 2-cyclohexyl-4,6-dinitrophenol. Vacuum distillation at reduced pressure of the dried, inhibited liquid isolated ethyl N-ar-vinylbenzyl carbamate (27 grams, or 78 percent yield) which boiled at from 130 to 132° C. at a pressure of 0.6 mm. of mercury. Certain other characteristics of the purified product were as follows: index of refraction $N_D^{25}$, 1.5417; specific gravity $d_4^{25}$, 1.0719.

Analysis.—Calculated: C, 70.20%; H, 7.36%; N, 6.82%. Found: C, 70.10%; H, 7.36%; N, 6.47%.

In a manner similar to the foregoing example, any of the isologous haloformates indicated above can be reacted with other vinylidenearylenemethylene primary or secondary amines as referred to hereinabove to produce vinylidenearylenemethylene carbamates. The products have similar properties and utilities, for example, they can be polymerized as indicated below.

EXAMPLE 2

Ten grams of ethyl N-ar-vinylbenzyl carbamate was placed in a glass tube with 0.01 gram of α,α'-azo-bis-isobutyronitrile. After being sealed under nitrogen the tube was heated to 60° C. and was maintained at about that temperature for two days. The polymer product obtained thereby was colorless and moldable.

In a manner similar to Example 2, the other vinylidenearylenemethylene carbamates of this invention can be polymerized alone or in admixture with other ethylenically unsaturated monomers as hereinabove indicated in the presence of a polymerization-inducing catalyst such as the catalyst of Example 2 or one of the so-called percatalysts such as the peroxides, e.g., hydrogen peroxide and benzoyl peroxide, or such as the persulfates, e.g., potassium persulfate, and the like, to produce solid polymers which can be molded into useful shaped articles. The ionic catalysts such as $AlCl_3$, $TiCl_4$ and $BF_3$ are particularly useful when the vinylidene portion of the vinylidenearylenemethylene carbamate is an alpha-methyl-substituted vinyl radical, i.e.,

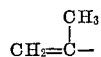

Application of intense heat to the polymeric product releases carbon dioxide which aids in suppressing burning, i.e., the polymers have self-extinguishing characteristics.

What is claimed is:

1. A process for the production of a vinylidenearylenemethylene carbamate which comprises reacting at a temperature of from about 0° C. to about $-20°$ C. an isologous haloformate and a vinylidenearylenemethylene amine having at least one hydrogen covalently bonded to a nitrogen atom of the amine; said isologous haloformate having the general formula

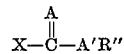

wherein X is a halogen, A and A' individually are selected from the group consisting of oxygen and sulfur and R" is a hydrocarbon radical having up to 20 carbon atoms and said vinylidenearylenemethylene amine having the formula

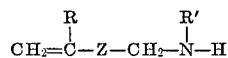

wherein R is selected from the group consisting of hydrogen and methyl, Z is an arylene, and R' is a radical selected from the group consisting of hydrogen, lower alkyls, and hydrocarbon radicals having from 5 to 20 carbon atoms.

2. The process of claim 1 in which the temperature is from about $-5°$ C. to about $-15°$ C.

3. The process of claim 1 in which R is hydrogen.

4. The process of claim 1 in which R' is hydrogen.

5. The process of claim 1 in which Z is phenylene.

6. The process of claim 1 in which A and A' of the isologous haloformate are oxygen.

7. The process of claim 1 in which X of the isologous haloformate is chlorine.

8. The process of claim 1 in which R and R' are hydrogen, R" is ethyl, Z is phenylene and the molar amount of the vinylidenearylenemethylene amine is at least as great as the molar amount of the isologous haloformate.

9. A compound having the general formula

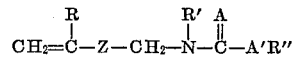

wherein R is a radical selected from hydrogen and methyl, Z is an arylene, A and A' are selected individually from oxygen and sulfur, R' is a radical selected from the group consisting of hydrogen, lower alkyls, and hydrocarbon radicals having from 5 to 20 carbon atoms, and R″ is a radical selected from the group consisting of lower alkyls and hydrocarbon radicals having from 5 to 20 carbon atoms.

10. The compound of claim 9 in which A is oxygen.
11. The compound of claim 9 in which A′ is oxygen.
12. The compound of claim 9 in which R is hydrogen.
13. The compound of claim 9 in which Z is phenylene.
14. The compound of claim 9 in which R′ and R″ are lower alkyl.
15. The compound of claim 9 in which R and R′ are hydrogen, A and A′ are oxygen, and R″ is lower alkyl.
16. A polymer of a monomer having the general formula

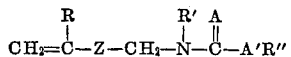

wherein R is a radical selected from hydrogen and methyl, Z is an arylene, A and A′ are selected individually from oxygen and sulfur, R′ is a radical selected from the group consisting of hydrogen, lower alkyls, and hydrocarbon radicals having from 5 to 20 carbon atoms, and R″ is a radical selected from the group consisting of lower alkyls and hydrocarbon radicals having from 5 to 20 carbon atoms.

17. The polymer of claim 16 in which A and A′ are oxygen.
18. The polymer of claim 16 in which Z is phenylene.
19. The polymer of claim 16 in which R and R′ are hydrogen, R″ is ethyl and Z is phenylene.
20. A copolymer of a monoethylenically unsaturated polymerizable monomer and ethyl N-ar-vinyl-benzyl carbamate.

References Cited

UNITED STATES PATENTS 2,593,888   4/1952   Jones _____ 260—80.3
2,748,103   5/1956   Priest _____ 260—80.3

JOSEPH L. SCHOFER, *Primary Examiner.*

HARRY WONG, JR., *Assistant Examiner.*

U.S. Cl. X.R.

204—154, 158; 260—80, 471, 455, 79.7, 88.1, 85.7, 87.7, 78.5, 86.1, 85.5, 77.5